United States Patent [19]

Mankin

[11] Patent Number: 5,186,828
[45] Date of Patent: Feb. 16, 1993

[54] PAINT STRAINER KIT

[76] Inventor: Gary L. Mankin, 38872 Juniper Rd., Palmdale, Calif. 93551

[21] Appl. No.: 835,417

[22] Filed: Feb. 14, 1992

[51] Int. Cl.$^5$ ............................................. B01D 29/085
[52] U.S. Cl. .................................. 210/232; 210/455; 210/469; 210/474; 210/497.2
[58] Field of Search ............... 210/232, 338, 413, 455, 210/469, 473, 474, 475, 476, 477, 479, 470, 437, 497.1, 482, 497.2; 206/223

[56] References Cited

U.S. PATENT DOCUMENTS

| | | | |
|---|---|---|---|
| 1,451,206 | 4/1923 | Dow | 210/473 |
| 1,688,751 | 10/1928 | Schnitger | 210/473 |
| 2,250,646 | 7/1941 | Metsch | 210/475 |
| 2,844,256 | 7/1958 | Campbell | 210/473 |
| 4,946,591 | 8/1990 | Mealey | 210/474 |

Primary Examiner—Robert A. Dawson
Assistant Examiner—W. L. Millard
Attorney, Agent, or Firm—Roger A. Marrs

[57] ABSTRACT

A strainer for liquids such as paint is disclosed herein having a collection bucket or pail which includes a circular opening defined by a lip. An intermediate retaining member is removably supported on the pail lip and detachably supports a strainer bag or meshed sheet across its circular opening to filter the liquid poured into the bag. A retainer member detachably fits over the edge marginal region of the filter bag to retain the bag in its supported position on the intermediate member. This latter member includes a cut-out opening adjacent to the pail lip for conducting a spray gun attachment or hose.

3 Claims, 1 Drawing Sheet

PAINT STRAINER KIT

BACKGROUND OF THE INVENTION

1. Field of the Invention

The present invention relates to the field of liquid strainers such as paint and the like, and more particularly to a novel strainer for paint which includes a retaining means for holding a strainer bag in position over a collection container.

2. Brief Description of the Prior Art

In the past, it has been the conventional practice to strain paint flowing from a can into a collection pail or bucket so that the paint is clean and free from foreign debris, dirt, dried paint or the like. In this practice, a user may normally use a screen, filter paper or a small mesh fabric. Although such items are useful in straining paint, it is difficult to hold the filter in position during the straining procedure and removal of the filter is generally cumbersome, messy and is difficult to dispose of. Furthermore, most modern straining means for this purpose fail to incorporate means for accommodating a sprayer and hose so that the cleansed paint can be removed from the container. For example, U.S. Pat. No. 4,946,591 discloses a paint strainer which may incorporate a spraying device but which does not adequately hold the strainer filter in position during the straining procedure. The strainer filter may not come into contact with the strained paint as the level of the strained paint increases in the collection bucket or pail so that the filter will dry out.

Therefore, a long-standing need has existed to provide a multi-piece means for mounting and releasably retaining a paint filter or bag in position so that paint may be poured through the filter material or bag into a collection retainer whereby the filter or bag is supported on an intermediate member disposed between a filter or bag clamping piece and the upper edge of the pail or bucket.

SUMMARY OF THE INVENTION

Accordingly, the above problems and difficulties are obviated by the present invention which provides a novel paint strainer taking the form of a kit which may be assembled at a paint site so that a quantity of paint may be strained therethrough and collected into a bucket or pail. In one form of the invention, a bottom piece is snap-locked into position over the lip defining a mouth or entrance of the pail leading into the storage interior. The bottom piece includes a cutout in order to accommodate passage of a spray gun hose which, under pumping pressure, forces the cleaned paint from the pail to a spray gun for application on the job site. A filter bag having an elastic top is placed over the bottom piece so that the bag downwardly depends through the central opening of the bottom piece through which unfiltered paint can be passed. The elastic band about the top of the bag retains the bag in position; however, an intermediate centerpiece or retainer is employed in coaxial relationship with respect to the bottom piece for holding the bag in its supported position on the bottom piece. The intermediate holder releasably snap-locks over the edge marginal region of the filter bag placed on the bottom piece so that the unfiltered paint will pass through the holder or intermediate piece into the filter bag. The final portion of the assembly kit is a top lid which may be placed over the holder intermediate piece to prevent air from reaching the exposed paint liquid.

The bottom piece with the filter bag retained thereon by the holder intermediate piece maintains the bottom of the filter bag into the collection of strained paint in the pail to keep the bag moist.

Therefore, it is among the primary objects of the present invention to provide a novel paint straining device which is provided in a kit form for installation at a painting site whereby the filter bag is retained in a reinforced manner.

Another object of the present invention is to provide a novel straining apparatus comprising at least a three-part construction which is coaxially snap-locked together in order to support the edge marginal region of a filter bag which occupies the central opening of the assembly whereby paint intended to be strained can be poured therethrough for the collection of foreign matter and other debris.

Still another object of the present invention is to provide a novel paint straining device which incorporates a bottom piece detachably connectable to the circular lip of a collecting pail or bucket and which further includes a holder or retaining member that keeps the edge marginal region of the bag well secured to the assembly while the straining part of the bag downwardly depends therefrom.

Yet another object of the invention is to permit the filter or strainer bag to be submerged into the collected paint to maintain the filter or bag moist.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
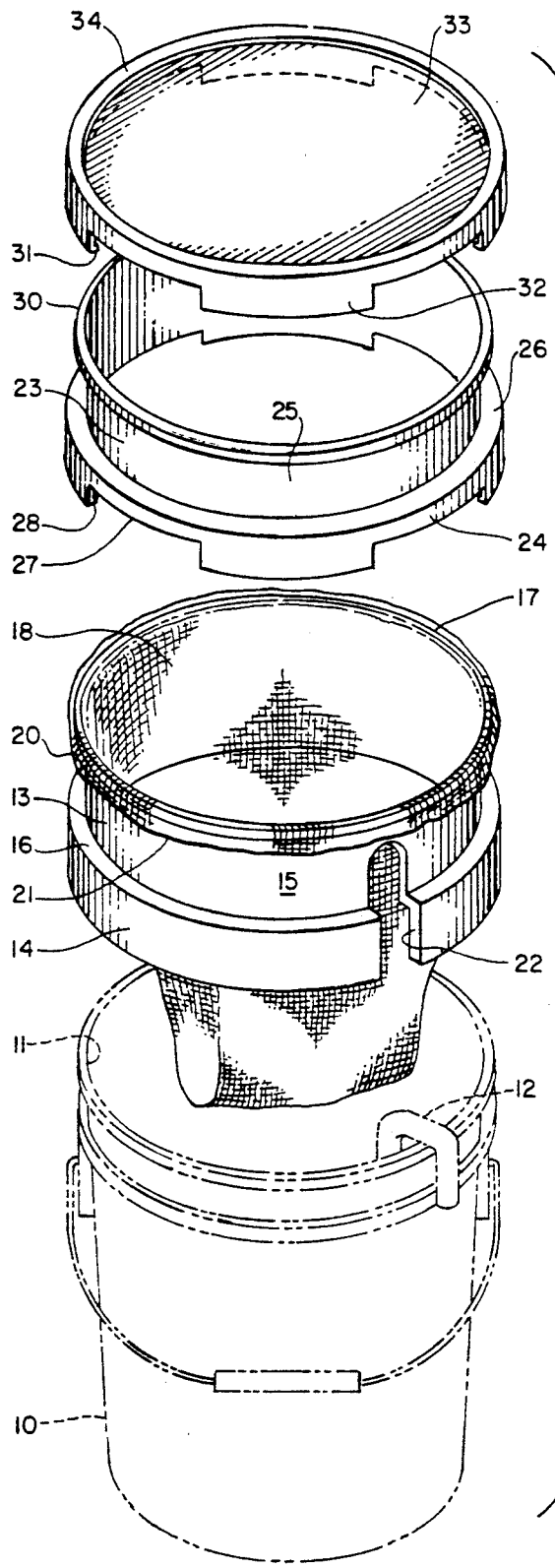
Referring to FIG. 1, an exploded perspective view of the present invention is illustrated in which the strainer kit is in position preparatory for installation on a conventional pail or bucket.

Referring to FIG. 1, a conventional pail or bucket is illustrated by numeral 10, which includes an upper lip 11 which is circular and defines an opening in the bucket or pail 10 leading into a storage cavity. Disposed over the lip 11 for spray gun purposes, there is provided a conduit or hose 12 leading from a supply of paint in the pail to a pump and spray gun arrangement.

A bottom piece or member, indicated by numeral 13, fits directly over the pail and includes a flange 14 which is of wider diameter than the central portion 15 so as to define a shoulder 16 which sits on top of the lip 11 when the bottom piece is assembled with the pail. The bottom piece is coaxially disposed with respect to the pail 10 and further includes a rounded bead 17 defining an upper edge on the side of the center portion 15 opposite to the flange 14. A filtering bag 18 is provided and includes an edge marginal region 20 which is deployed over the rounded bead 17 and is temporarily held in position by an elastic membrane or band 21. A cutout or slot 22 is provided through a portion of the flange 14 and the central portion 15 so as to accommodate the thickness and disposition of the conduit 12.

A retainer 23 is similar to the bottom member or piece 13 which includes a flange 24 which is joined to the central body or portion 25 by shoulder 26. The flange 24 includes a series of cutouts, such as cutout 27, so that the flange may be readily snap-locked over the bead 17 to retain the edge marginal region of the bag 18 in position. The inside diameter of the flange 24 inwardly projecting from the cutout segments includes a bead 28 which snaps under the bead 17 to hold the bag in position. The side of the central portion 25 from its side carrying the shoulder 26 and flange 24 includes a shoulder 30 adapted to receive an inner bead 31 carried on each of the respective segments, such as segment 32, downwardly depending from a central disc 33. The piece or member, indicated by numeral 34, may serve as a lid to cover the opening leading into the bag and into the pail.

Figure 2:
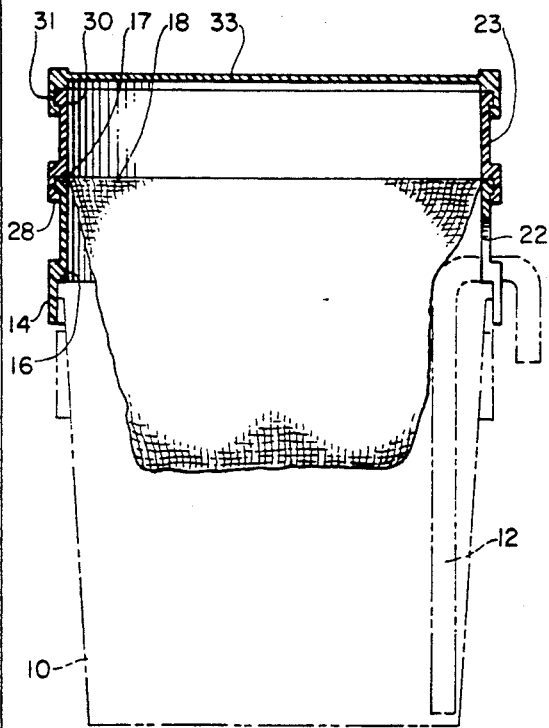
FIG. 2 is a transverse cross-sectional view of the novel paint strainer assembled on the bucket in condition for use in a paint-straining procedure.

Referring now in detail to FIG. 2, it can be seen that the three pieces of the strainer kit are joined together and assembled with the pail 10. All the pieces or members are in coaxial relationship and the bag 18 is retained in position so that a major length of the bag is within the top portion of the bucket or pail 10. The conduit 12 is passed through the slot 22 and the lid 34 covers the assembly when a pouring procedure is not being performed.

Referring now in detail to FIG. 2, it can be seen that the lid 34 is snap-locked into retention with the intermediate holder 23 by means of bead 31 associated with each downwardly depending segment 32 overlapping the shoulder 30. In a similar manner, the segments of the intermediate holder 23 have their beads 28 in snap-lock engagement with the shoulder 17 carried on the bottom piece 13. The edge marginal region of bag 18 is interposed therebetween for circular retention. The flange 14 is passed over the upper edge of the pail or bucket 10 so that the lip 11 rests on shoulder 16.

In view of the foregoing, it can be seen that paint having foreign matter therein may be poured through the openings of the intermediate member 23 and the bottom piece or member 22 when the lid 33 is off. The paint settles through the filter mesh of the bag 18 and the clean and filtered paint collects into the bottom of the pail 10. The strainer kit of the present invention may easily be assembled or disassembled at the site and may be easily cleaned and the bag may be readily changed without difficulty, use of special tools or requiring skilled personnel. Preferably, the three-piece strainer kit construction is composed of plastic or plastic-like materials and it is important to know that the slot 22 will readily accommodate passage of the spray conduit 12.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A paint strainer comprising:
   a pail having a circular upper edge carrying a circular lip;
   a bottom piece seated on said pail lip in coaxial relationship therewith;
   a filter bag having an edge marginal region folded over said bottom piece so that a major length of said filter bag downwardly depends into said pail;
   a holder seated on said bottom piece having said bag edge marginal region disposed therebetween;
   said bottom piece and said holder snap-lock fastener means detachably connecting together;
   a cap detachably coupled to said holder in spaced relationship to said filter bag.

2. The invention as defined in claim 1 wherein:
   said bottom piece includes an upper edge and a lower edge separated by a continuous sidewall;
   said sidewall having an elongated slot opening at said lower edge and said slot terminated at said pail upper edge;
   said slot communicating with the interior of said pail exteriorly of said bottom piece.

3. The invention as defined in claim 2 wherein:
   said holder is circular with a shoulder portion about a lower edge jutting outwardly to define an inner receptacle for receiving said upper edge of said bottom piece releasable engagement.

* * * * *